(12) United States Patent
Crowley et al.

(10) Patent No.: US 12,299,293 B2
(45) Date of Patent: May 13, 2025

(54) BLOCKCHAIN-ENABLED STORAGE ARRAY

(71) Applicant: EMC IP Holding Company LLC, Hopkinton, MA (US)

(72) Inventors: Owen Crowley, Carrigaline (IE); Pawel Wasylyszyn, Cracow (PL)

(73) Assignee: Dell Products L.P., Round Rock, TX (US)

( * ) Notice: Subject to any disclaimer, the term of this patent is extended or adjusted under 35 U.S.C. 154(b) by 736 days.

(21) Appl. No.: 17/382,435

(22) Filed: Jul. 22, 2021

(65) Prior Publication Data

US 2023/0022330 A1    Jan. 26, 2023

(51) Int. Cl.
*G06F 12/00* (2006.01)
*G06F 3/06* (2006.01)

(52) U.S. Cl.
CPC .......... *G06F 3/0622* (2013.01); *G06F 3/0611* (2013.01); *G06F 3/0619* (2013.01); *G06F 3/0653* (2013.01); *G06F 3/0659* (2013.01); *G06F 3/067* (2013.01); *G06F 3/0689* (2013.01)

(58) Field of Classification Search
CPC ..... G06F 3/0611; G06F 3/0619; G06F 3/0622
USPC ......................................................... 711/163
See application file for complete search history.

(56) References Cited

U.S. PATENT DOCUMENTS

| | | | | |
|---|---|---|---|---|
| 9,823,973 | B1* | 11/2017 | Natanzon ................ | G06F 3/067 |
| 11,397,529 | B2* | 7/2022 | Chen ..................... | G06F 3/0653 |
| 2015/0244804 | A1* | 8/2015 | Warfield ................. | H04L 49/90 |
| | | | | 709/219 |
| 2016/0062846 | A1* | 3/2016 | Nallathambi ....... | G06F 11/3034 |
| | | | | 707/649 |
| 2018/0198791 | A1* | 7/2018 | Desai .................. | H04L 63/0807 |
| 2020/0133531 | A1* | 4/2020 | Subramaniam ........ | G06F 9/5027 |
| 2020/0143372 | A1* | 5/2020 | Liu ........................ | H04L 9/3239 |
| 2020/0233598 | A1* | 7/2020 | Bezugly ................. | G06N 20/20 |
| 2021/0352139 | A1* | 11/2021 | Madisetti .................. | H04L 9/50 |
| 2022/0187969 | A1* | 6/2022 | Shashidhara .......... | G06N 20/20 |
| 2022/0358450 | A1* | 11/2022 | Stephens ............... | H04L 9/3213 |
| 2023/0022330 | A1* | 1/2023 | Crowley ............... | G06F 3/0689 |

* cited by examiner

*Primary Examiner* — Mohamed M Gebril
(74) *Attorney, Agent, or Firm* — Krishnendu Gupta; Nikhil Patel

(57) ABSTRACT

The present disclosure relates to establishing a tightly coupled integration between a decentralized blockchain network and a centralized storage array. In embodiments, a first set of storage operations on a snapshot of a storage array are performed. Further, data blocks generated from the snapshot are broadcast to at least one computing network for the at least one computing network's nodes to perform a second set of storage operations.

20 Claims, 4 Drawing Sheets

BLOCKCHAIN-ENABLED STORAGE ARRAY

BACKGROUND

Blockchain is a list of records called blocks that store data publicly and in chronological order. The information is encrypted using cryptography to maintain data privacy and to prevent unauthorized data alterations. A blockchain network is decentralized and thus, is not controlled by a centralized authority, unlike modern financial institutions. Each device connected to a blockchain network assists in maintaining data stored on the network. Additionally, each device holds democratic authority to approve any transaction on the blockchain network.

SUMMARY

The present disclosure relates to establishing a tightly coupled integration between a decentralized blockchain network and a centralized storage array. In embodiments, a first set of storage operations on a snapshot of a storage array are performed. Further, data blocks generated from the snapshot are broadcast to at least one computing network for the at least one computing network's nodes to perform a second set of storage operations.

In embodiments, the storage array can be a centralized storage array, and the at least one computing network can be a private decentralized network of computing nodes.

In embodiments, qualifying the storage array as a full node of the computing network can include provisioning at least a first threshold amount of the storage array's resources for performing the first set of storage operations.

In embodiments, the computing network's nodes can include less than a second threshold amount of resources for performing the second set of storage operations.

In embodiments, the first set of storage operations can include pre-processing the data blocks.

In embodiments, the snapshot can be pre-processed by generating a first data block of the snapshot's data blocks having at least a header and a payload.

In embodiments, a first hash can be generated using the snapshot's corresponding metadata. Additionally, the first hash can be inserted in the first data block's header. Further, the first data block's payload can be filled with the metadata.

In embodiments, a second data block of the snapshot's data blocks can be generated. Further, the second data block generation can generate a second hash from the first hash, insert the second hash into the second data block's header, and fill the second data block's payload with the first hash.

In embodiments, each of the computing network's nodes can be enabled to verify at least the first and second data blocks. Additionally, each of the computing network's nodes can be authorized to store at least the first and second data blocks in response to a positive verification.

In embodiments, one or more input/output (IO) workloads received by the storage array can be monitored. Further, one or more IO write patterns related to each IO workload can be identified.

DETAILED DESCRIPTION

Data storage is an essential component in business, governance, and even people's lives. Most successful companies have organized data storage systems that are secure and ensures easy information retrieval. Information such as accounting records, policies, and human resource data, amongst other information, need secure storage systems that protect against losses and theft and one with a reliable recovery process. While there are many data storage options, centralized and distributed data storage are among the most common ways to store data.

An organization can use centralized storage techniques to maintain and store information in a central database (e.g., at a single location). The database can allow access over a network (e.g., the Internet). However, centralized storage techniques can provide a single point of failure. For example, if a system error occurs, some or all the data stored by the central database can be corrupted or lost.

The organization can also use decentralized data storage techniques to spread data across physical locations using multiple servers. Typically, decentralized data storage techniques can include a data manager that manages data distribution across physical locations. A hacker can access the data manager and modify data (e.g., bank account records and transactions), causing significant harm to the organization and its customers. In other examples, organizations can use a decentralized blockchain network. However, blockchain protocols require each node of the blockchain network to reach a consensus regarding the authenticity of a transaction before the blockchain network acknowledges and commits it to the network. The consensus can take a significant amount of time that does to satisfy the organization's performance requirements. Additionally, blockchain networks are not well suited to store large volumes of data because the chain would become cumbersomely large.

Embodiments of the present disclosure relate to establishing a tightly coupled integration between a decentralized blockchain network and a centralized storage array. The integration forms a hybrid storage network with a centralized storage network's speed and performance capabilities and benefits from the security of a decentralized blockchain network, as described in greater detail herein. Further, the present disclosure prevents data chains of a blockchain network from becoming cumbersomely large by storing metadata or data hashes of information rather than mirroring data it stores in the array.

Figure 1:
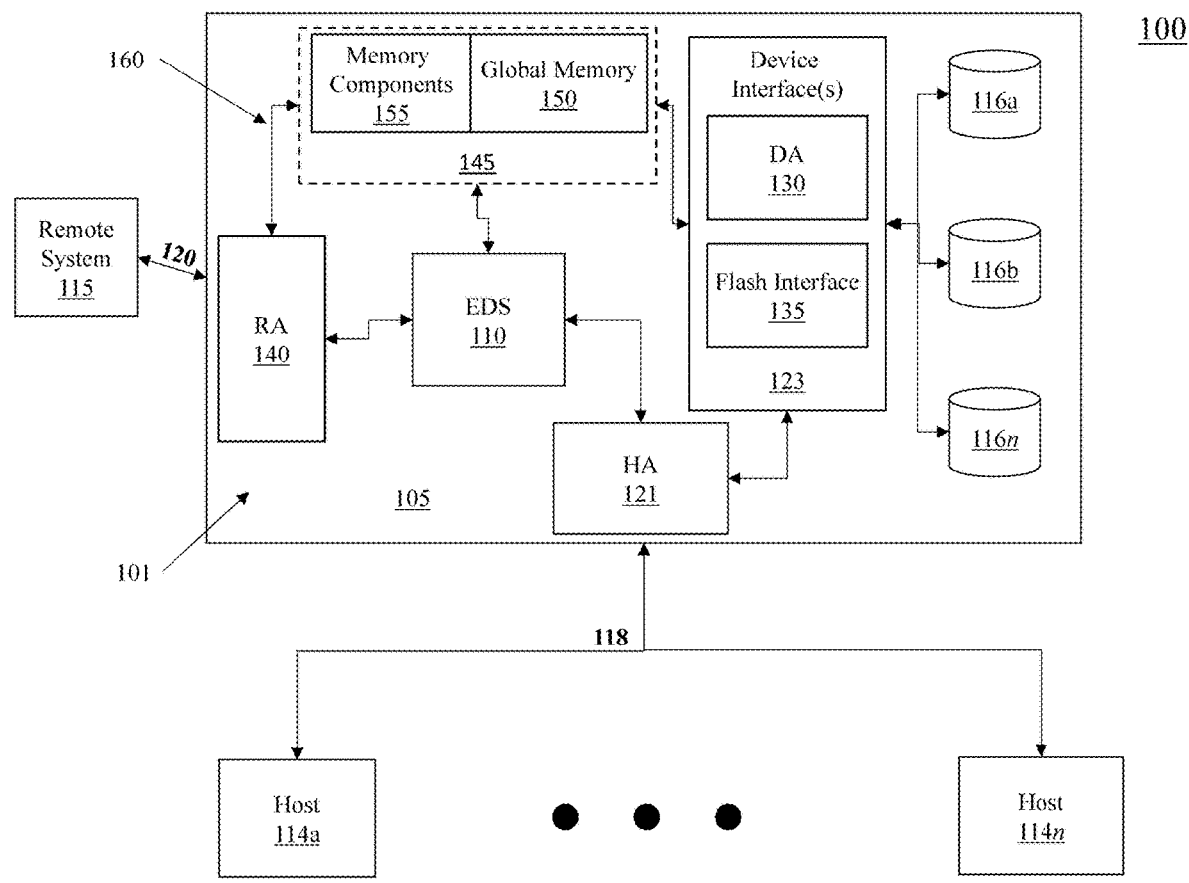
FIG. 1 is a block diagram of a storage array in accordance with embodiments of the present disclosure.

Regarding FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, or communication modules. For example, the array's global memory 150 can use the communication channels 160 to transfer data or send other communications between the array's components 101.

In embodiments, the array 105 and one or more devices can form a network. For example, a first communication network 118 can communicatively couple the array 105 to one or more host systems 114a-n. Likewise, a second communication network 120 (e.g., remote network) can communicatively couple the array 105 to a remote system 115. Thus, the first and second networks 118, 120 can interconnect devices to form a network (networked devices). The network can be a wide area network (WAN) (e.g., Internet), local area network (LAN), intranet, Storage Area Network (SAN)), and the like.

In further embodiments, the array 105 and other networked devices (e.g., the hosts 114a-n and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The array 105, remote system 116, hosts 114a-n, and the like can connect to the first or second networks 118,120 via a wired/wireless network connection interface, bus, data link, and the like. Further, the first and second networks 118, 120 can also include communication nodes that enable the networked devices to establish communication sessions. For example, communication nodes can include switching equipment, phone lines, repeaters, multiplexers, satellites, and the like.

In embodiments, one or more of the array's components 101 can process input/output (IO) workloads. An IO workload can include one or more IO requests (e.g., operations) originating from one or more of the hosts 114a-n. The hosts 114a-n and the array 105 can be physically co-located or located remotely from one another. In embodiments, an IO request can include a read/write request. For example, an application executing on one of the hosts 114a-n can perform a read or write operation resulting in one or more data requests to the array 105. The IO workload can correspond to IO requests received by the array 105 over a time interval.

In embodiments, the array 105 and remote system 115 can include any proprietary or commercially available single or multi-processor systems (e.g., an Intel-based processor and the like). Likewise, the array's components 101 (e.g., HA 121, RA 140, device interface 123, and the like) can include physical/virtual computing resources (e.g., a processor and memory) or require access to the array's resources. For example, the memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114a-n). For example, the HA 121 can direct one or more IOs to one or more of the array's components 101 for further storage processing. In embodiments, the HA 121 can direct an IO request to the array's device interface 123. The device interface 123 can manage the IO request's read/write data operation requiring access to the array's data storage devices 116a-n. For example, the data storage interface 123 can include a device adapter (DA) 130 (e.g., storage device controller), flash drive interface 135, and the like that controls access to the storage devices 116a-n. Likewise, the array's Enginuity Data Services (EDS) processor 110 can manage access to the array's local memory 145. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116a-n can include one or more data storage types, each having distinct performance capabilities. For example, the storage devices 116a-n can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be a volatile or nonvolatile memory. Unlike nonvolatile memory, volatile memory requires power to store data. Thus, volatile memory loses its stored data if the array 105 loses power for any reason. In embodiments, the primary memory can include dynamic (RAM) and the like, while cache memory can include static RAM. Like the array's storage devices 116a-n, the array's memory 145 can have different storage performance capabilities.

In embodiments, a service level agreement (SLA) can define at least one Service Level Objective (SLO) the hosts 114a-n expect the array 105 to achieve. For example, the hosts 115a-n can include host-operated applications. The host-operated applications can generate data for the array 105 to store or read data the array 105 is storing. In addition, the hosts 114a-n can assign different levels of business importance to data types they generate or read. Thus, each SLO can define a service level (SL) for each data type the hosts 114a-n write to or read from the array 105. Further, each SL can specify the host's expected storage performance requirements (e.g., a response time and uptime) for one or more data types.

Accordingly, the array's EDS 110 can establish a storage/memory hierarchy based on one or more of the SLA and the array's storage/memory performance capabilities. For example, the EDS 110 can establish the hierarchy to include one or more tiers (e.g., subsets of the array's storage/memory) with similar performance capabilities (e.g., response times and uptimes). Thus, the EDS-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

In embodiments, the HA 121 can present the hosts 114a-n with logical representations of the array's physical storage devices 116a-n and memory 145 rather than giving their respective physical address spaces. For example, the EDS 110 can establish at least one logical unit number (LUN) representing a slice or portion of a configured set of disks (e.g., storage devices 116a-n). The array 105 can present one or more LUNs to the hosts 114a-n. For example, each LUN can relate to at least one physical address space of storage. Further, the array 105 can mount (e.g., group) one or more LUNs to define at least one logical storage device (e.g., logical volume (LV)).

In further embodiments, the HA 121 can receive an IO request identifying one or more of the array's storage tracks. Accordingly, the HA 121 can parse that information from the IO request to route its related data to a target data track. In other examples, the array 105 may not have previously associated a storage track to the IO request's related data. The array's DA 130 can assign at least one storage track to service the IO request's related data in such circumstances.

The DA 130 can give each storage track a unique track identifier (TID) in embodiments. Accordingly, each TID can correspond to one or more physical storage address spaces of the array's storage devices 116*a-n* or global memory 145. The HA 121 can store a searchable data structure that identifies the relationships between LUN, LV, TID, or physical address spaces. For example, a LUN can correspond to a physical address space, while an LV can correspond to one or more LUNs. Thus, a group of LUNs can identify an entire storage track (e.g., TID).

In embodiments, the array's RA 140 can manage communications between the array 105 and an external storage system (e.g., remote system 115) over, e.g., the second network 120 using a communications protocol. For example, the first network 118 or second network 120 can be an Explicit Congestion Notification (ECN) Enabled Ethernet network. In addition, the RA 140 can include a remote network controller 165 configured to establish and manage a data backup or recovery remote network 115. For example, the remote network controller 165 can include logic or circuitry elements (e.g., elements 310 of FIG. 3) that deliver remote network services described in greater detail herein. Although the illustration shows the network controller 165 residing in the RA 140, a skilled artisan understands that the entire controller 165 or at least one of its elements can reside in one or more of the array's other components 101, such as the EDS 110 or HA 121.

Figure 2:
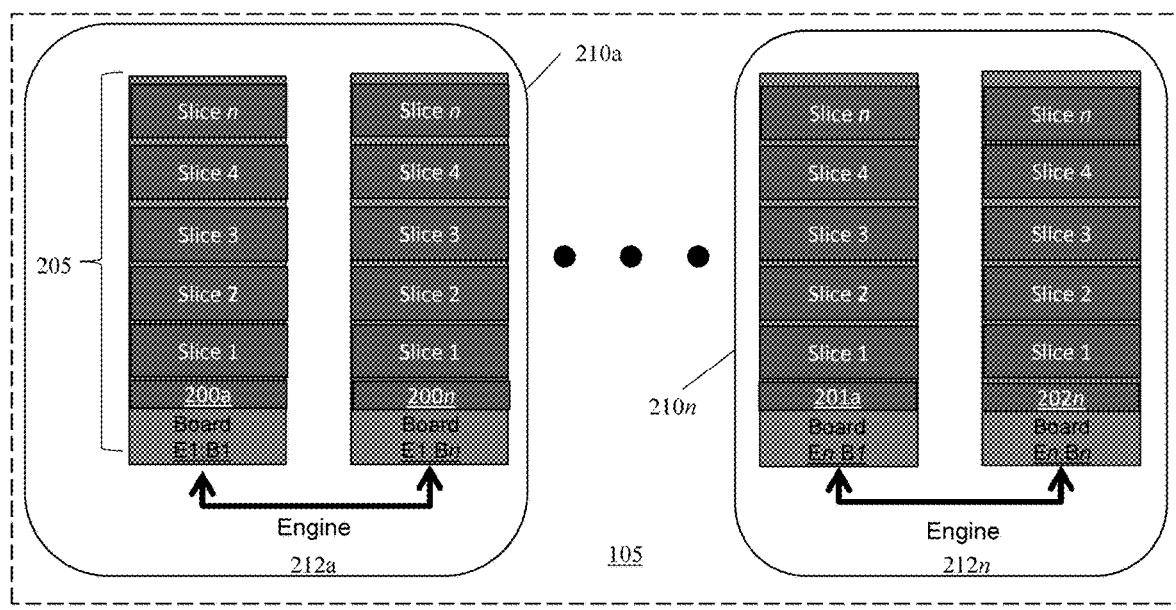
FIG. 2 is a block diagram of a blockchain distributed storage network in accordance with embodiments of the present disclosure.

Referring to FIG. 2, a remote network 120 (e.g., the second network 120 of FIG. 1) can include a communications network 240 that communicatively couples the array 105 to the remote system 115. In embodiments, the array's RA 140 can include a network controller 165 that establishes and manages the remote network 120 as described in greater detail herein.

In embodiments, the remote system 115 comprises nodes 210*a-n*, forming a decentralized node network 220. For example, the array's network controller 165 can provide at least one of the nodes 210*a-n* (e.g., Light Node 210*a*) with one or more internode links 235 to one or more of the other nodes 210*a-n* (e.g., Light Node 210*b*). The network controller 165 can deliver the internode links 235 with a communications protocol. The communications protocol can allow the nodes 210*a-n* to exchange information and data. The communications protocol can include instructions and policies (e.g., rules, syntax, semantics, and the like) to enable internode exchanges of messages and signals to pass the information and data between the nodes 210*a-n*. In embodiments, the network controller 165 can include instructions in the protocol that causes the links 235 to logically arrange the nodes 210*a-n* in a logical node chain 230 as described in greater detail herein.

In embodiments, the communications network 240 can include one or more channels or paths 245 that logically connect the array 105 to the remote system 115. Further, the channels or paths 245 can comprise one or more intermediary communication devices that allow the array 105 and the remote system 115 to establish communication sessions. For example, intermediary communication devices can include networking hardware 221 such as computing nodes (e.g., computers), servers, networking hardware, bridges, switches, hubs, and the like. Additionally, the intermediary communication devices can define one or more communication channels or paths between the array 105, the remote system 115, or one or more of the system's nodes 210*a-n*.

In embodiments, the network controller 165 can establish one or more direct communications channels between the array 105 and at least one of the nodes 210*a-n*. Furthermore, the network controller 165 can logically group a set of the direct communications channels to form a dedicated virtual communications tunnel 215. For example, the nodes 210*a-n* can establish the logical node chain 230 with a primary chain link node (e.g., node 210*a*). Thus, the array 105 can mirror its stored information (e.g., data, transactions, and events) it receives from host IO requests via the virtual tunnel 215 rather than broadcasting the stored information to each node 210*a-n*. In embodiments, the network controller 165 can provision the nodes 210*a-n* with a protocol that delivers a distributed blockchain backup of the array's stored information as described in greater detail herein.

Figure 3:
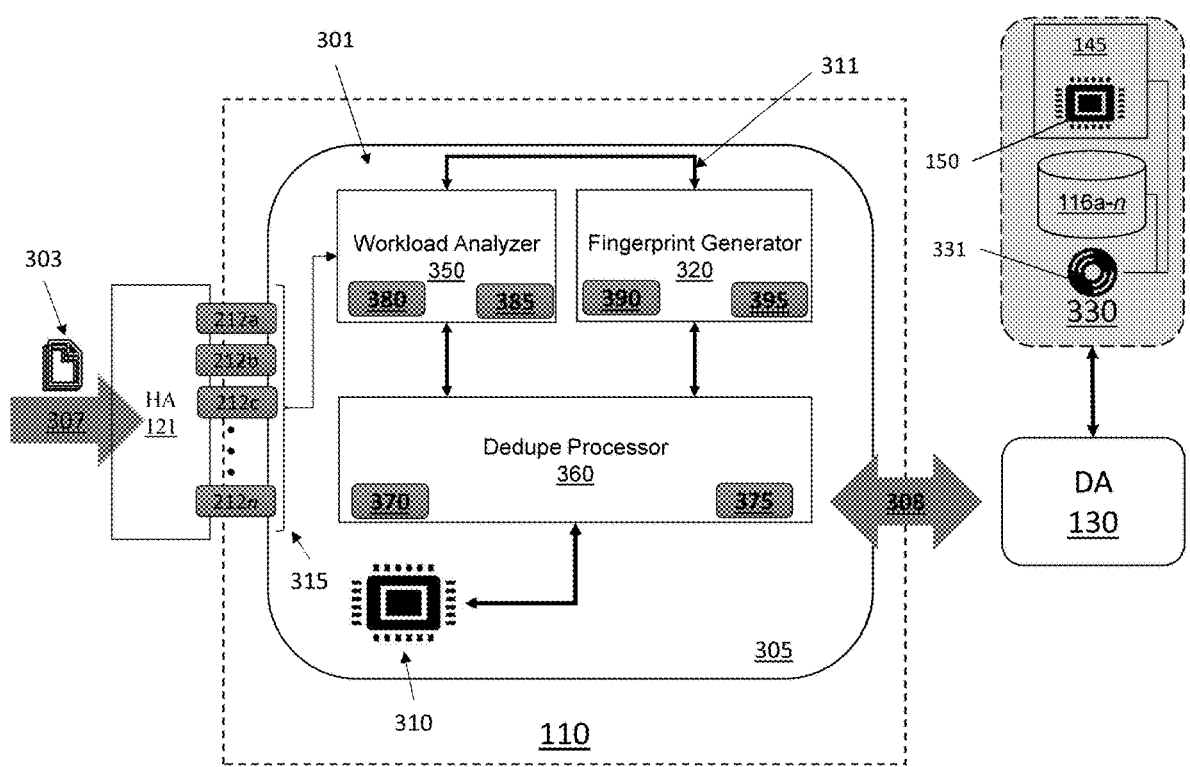
FIG. 3 is a block diagram of a blockchain storage controller in accordance with embodiments of the present disclosure.

Referring to FIG. 3, the array's RA 140 can include a network controller 165. In embodiments, the network controller 165 can configure and provide resources for a remote system 115. In addition, the network controller 165 can establish and manage communications between the array 105 and the remote system 115. For example, the network controller 165 can include hardware (e.g., circuitry) and logic (e.g., software) elements 301 that perform one or more network management operations. Further, the network controller 165 can include communication channels (e.g., Fibre channels) 335 that enable inter-component communications. Furthermore, one or more of the elements 301 can live elsewhere in one or more of the array's components 101 (e.g., the EDS 110 or HA 121), although FIG. 3 shows the elements residing in the controller 165.

In embodiments, the network controller 165 can include a node controller 305 that establishes and provisions resources defining a remote network 120. The remote network 120 can include the array 105, a communications network 240, and the remote system 115. The node controller 305 can establish the remote network 120 as a hybrid network that includes a centralized storage array (e.g., the array 105) and a decentralized node network 220. Further, the node controller 305 can define a hybrid communications protocol for the hybrid network 120

In embodiments, the node controller 305 can provision the remote network 120 with at least one full node 340 and a plurality of light nodes 210*a-n*. For example, node controller 305 can include a set of rules and policies in the hybrid communications protocol that provide each full node and light node requirements. The requirements can define a required amount of full and light nodes, communication methods, resource requirements, data processing, data authentication, and data storage, amongst other conditions. For example, the node controller 305 can establish the hybrid network 220 to provide data storage services. Accordingly, the network controller 305 can delegate storage roles and responsibilities for each full node 340 and light node 210*a-n*.

For example, a traditional blockchain can ensure data authenticity by requiring each node in a blockchain network to acknowledge and reach a consensus before committing the transaction. However, conventional blockchain nodes lack the capacity or computing resources to process large data volumes processed by storage arrays (e.g., array 105) within SLA-defined response times.

Thus, the node controller 305 can define a hybrid blockchain network 220 that distributes data storage processing between the full node 340 and the light nodes 210*a-n*. For example, the full node 340 can have the responsibility to perform a first set of storage operations. In contrast, the light nodes 210*a-n* can have the responsibility to perform a second set of storage operations. However, the first set of storage operations can require an amount of computing resources (e.g., memory, storage, and processing capabilities) that are significantly greater than the computing resources necessary to perform the second set of storage operations.

In embodiments, the node controller 305 can establish a node as a full node 340 if the node includes a threshold amount of computing resources required to perform the first set of storage operations. The node controller 305 can establish the threshold amount as a function of data processed by the array 105 within a certain response time (e.g., a response time defined by an SLA).

For example, the network controller 165 can include a workload analyzer 315 that can analyze IO workloads 300 received by an array's HA 121. The analyzer 315 can generate one or more snapshots of the array 105 and its components 101. For instance, the array 105 can include one or more daemons 350 that communicatively couple to the array's components 101. The daemons 350 can record their corresponding component's read/write activity and other storage-related activity in their respective activity logs. Each record can include information defining storage telemetry and performance data associated with the components 101. The storage telemetry and performance data can include device characteristics such as read/write data type, data size, storage/memory slot size, read/write performance, SL requirement, and telemetry data, amongst other event-related metadata. For example, the read/write performance can correspond to the array's response time to service IO read/write requests in the IO workload 300. The analyzer 315 can store this information in the network controller's local memory 340.

Further, the network controller 165 can include a machine learning (ML) engine 325 that can generate one or more computing resource models using the storage telemetry and performance data stored in local memory 330. The computing resource models can define the amount of computing resources required to satisfy a range of response times for specific IO workloads (e.g., workloads having different degrees of IOs per second (IOPS)). For example, the ML engine 325 can include logic or circuitry defining a neural network resource predictor that identifies patterns between IO workloads and response times. The ML engine 325 can further correlate those patterns with computing resource allocations during at least one time-window. Using the correlated data, the ML engine 325 can establish computing resource models that define computing resources requires to process workloads with specific 10P ranges within response times defined by an SLA. The node controller 305 can specify one or more full node resource requirements and light node resource requirements using the computing resource models.

In embodiments, the network controller 165 can include a block controller 320 that establishes and manages data storage operations. Using the computing resource models, the block controller 320 can provision array resources to perform the first set of storage operations. For example, the block controller 320 can pre-process data tracks that, e.g., the array's EDS 110 has flagged for remote blockchain authentication and backup. For example, pre-processing can include extracting metadata from the data track's related IO write request and the request's data payload. Further, the block controller 320 can format the extracted metadata into a block data packet. In addition, the block controller 320 can verify the data track's IO request, the request's related data, and their extracted metadata. For instance, the block controller 320 can use any known or yet to be known verification protocol. Because verification protocols can require extensive computing resources (e.g., especially for large data volumes or data sizes), embodiments of the present disclosure can speed blockchain-based storage performance by distributing resource-intensive operations to the full node 340.

In embodiments, the EDS 110 can flag data tracks based on the SLA (e.g., data tracks associated with critical and valuable information as defined by the SLA). For instance, the block controller 320 can identify if a flagged data track receives an IO write request during a snapshot time-window (e.g., a current snapshot time-window).

As such, the block controller 320 can identify each flagged data track that received an IO write request during any given snapshot time-window. Accordingly, the block controller 320 can format each IO write request's and the request's related data's metadata into a block data packet. In embodiments, the block controller 320 can establish each block data packet with a header and a payload. The block controller 320 can generate a hash from a data track's related metadata and insert it into a corresponding block data packet's header. Further, the block controller 320 can insert a copy of the metadata into the corresponding metadata's payload.

Further, the block controller 320 can direct and broadcast the block data packet to the hybrid blockchain network 220 to perform the second set of data operations. The second set of data operations can include processes related to data verification and backup. In embodiments, the block controller 320 can broadcast the block data packet to a first node (e.g., 210a) in the hybrid blockchain network 220. For example, the block controller 320 can include a network controller 321 that establishes a virtual tunnel 215 with the first node over a communications network (e.g., the communications network 240) as described herein. In embodiments, the network controller 321 can monitor block data packet transmissions to nodes on the hybrid network 220 to determine a bandwidth and throughput capability with one or more nodes. The network controller 321 form the virtual channel 215 with a first node 210a based on its current or anticipated bandwidth and throughput capabilities and further based on its neighboring nodes (e.g., one or more nodes with which the first node 210a has or can establish a chain link 235.

In embodiments, the network controller 321 can issue instructions with each data block packet transmission that defines rules for verifying and storing the metadata payload. For example, the network controller 3210 can append smart contracts with each block data packet that defines node storage and performance requirements according to, e.g., the SLA. Accordingly, the first node 210a can establish the blockchain of nodes by selecting child nodes (e.g., light nodes 210a-n) that satisfy the smart contract's defined requirements. In addition, the smart contract can include instructions for forming a node blockchain (e.g., node blockchain 230).

The instructions can require the first node 210a to verify the IO request by performing a hash of the data block packet's metadata header. The first node 210a can generate the hash using a cryptographic policy that the smart contract or hybrid network protocol has defined. If the hash result satisfies the cryptographic policy, the first node 210 stores its first hashed metadata as Block 1 in the node blockchain 1. Additionally, the instructions include rules for the number of nodes required to establish the blockchain 230. Based on the blockchain rules, the first node 210a passes its first hash metadata to a second light node 210b. According to the cryptographic policy, the second light node 210b stores the first hash metadata and generates a hash of the first hash metadata (second hash). The second light node 210*b* then passes the second hash to a third node. This hashing process continues until the blockchain length satisfies the hybrid network protocol's requirements. Once the nodes have verified the data block, the block is committed to the blockchain network and verified. In response to detecting a mismatch of a hash and an expected hash, the node identifying the mismatch can broadcast a potential unauthorized transaction to each node in the remote network 120.

Advantageously, embodiments of the present disclosure speed up blockchain commitment times by limiting node verification to metadata hashes and hashes of metadata hashes. Specifically, the resources and time required to perform such verifications are significantly less than those needed for original transaction data payloads.

The following text includes details of one or more methods or flow diagrams in accordance with this disclosure. For simplicity of explanation, the methods are depicted and described as a series of acts. However, acts in accordance with this disclosure can occur in various orders or concurrently and with other acts not presented and described herein. Furthermore, not all illustrated acts may be required to implement the methods described by the present disclosure.

Figure 4:
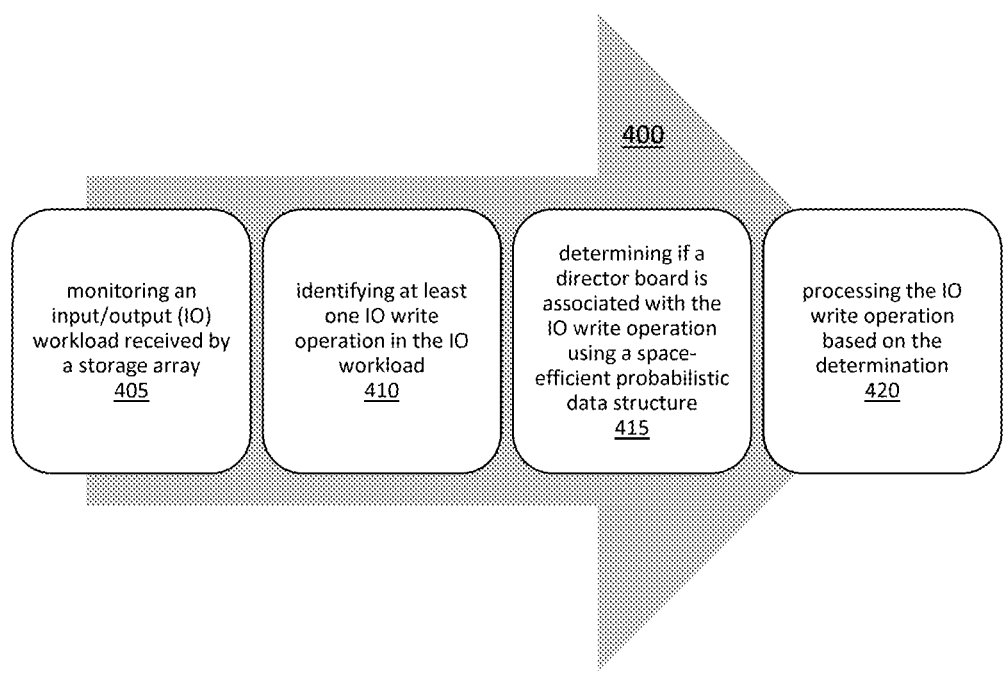
FIG. 4 is a flow diagram of a method for storing data between a tightly coupled decentralized blockchain network and a centralized storage array in accordance with embodiments of the present disclosure.

Regarding FIG. 4, a method 400 can be executed by any of the array's other components (e.g., components 101 of FIG. 1). The method 400 describes techniques for establishing a tightly coupled integration between a decentralized blockchain network and a centralized storage array. At 405, the method 400 can include performing a first set of storage operations on a storage array snapshot. The method 400, at 410, can also include broadcasting data blocks generated from the snapshot to at least one computing network for the at least one computing network's nodes to perform a second set of storage operations. It should be noted that each step of the method 400 can include any combination of techniques implemented by the embodiments described herein.

Using the teachings disclosed herein, a skilled artisan can implement the above-described systems and methods in digital electronic circuitry, computer hardware, firmware, or software. The implementation can be as a computer program product. The implementation can, for example, be in a machine-readable storage device for execution by or to control the operation of, data processing apparatus. The implementation can, for example, be a programmable processor, a computer, or multiple computers.

A computer program can be in any programming language, including compiled or interpreted languages. The computer program can have any deployed form, including a stand-alone program or subroutine, element, or other units suitable for a computing environment. One or more computers can execute a deployed computer program.

One or more programmable processors can perform the method steps by executing a computer program to perform functions of the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implement that functionality.

Processors suitable for executing a computer program include, by way of example, both general and special purpose microprocessors and any one or more processors of any digital computer. Generally, a processor receives instructions and data from a read-only memory, a random-access memory, or both. Thus, a computer's essential elements can include a processor that executes instructions that the computer's one or more memory devices store. Generally, a computer can include, can be operatively coupled to receive data from or transfer data to one or more mass storage devices for storing data (e.g., magnetic, magneto-optical disks, or optical disks).

Data transmission and instructions can also occur over a communications network. Information carriers suitable for embodying computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated in special purpose logic circuitry.

A computer having a display device that enables user interaction can implement the above-described techniques. The display device can, for example, be a cathode ray tube (CRT) or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system that includes a back-end component can also implement the above-described techniques. The back-end component can, for example, be a data server, a middleware component, or an application server. Further, a distributing computing system that includes a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication networks include a local area network (LAN), a wide area network (WAN), the Internet, wired networks, or wireless networks.

The system can include clients and servers. A client and a server are generally remote from each other and typically interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), or other packet-based networks. Circuit-based networks can include, for example, a public switched telephone network (PSTN), a private branch exchange (PBX), a wireless network, or other circuit-based networks. Finally, wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

The terms "comprise," "include," and "or" are open-ended, include the listed parts, and contain additional elements that are not listed. Additionally, the term "or" is open-ended and includes one or more of the listed parts and combinations of the listed features.

One skilled in the art will realize that other specific forms can embody the concepts described herein without departing from their spirit or essential characteristics. Therefore, the preceding embodiments are, in all respects, illustrative rather than limiting the concepts described herein. The appended claims thus recite the scope of this disclosure. Therefore, all changes embrace the meaning and range of equivalency of the claims.

What is claimed is:

1. A method comprising:
performing a first set of storage operations on a snapshot of a storage array;
forming a dedicated communications tunnel between the storage array and a primary chain link node of at least one computing network, including a computing node chain, wherein the dedicated communications tunnel is formed by logically grouping a set of direct communications channels established between the storage array and the primary chain link node; and
broadcasting data blocks generated from the snapshot to the primary chain link node for the computing chain node to perform a second set of storage operations via the dedicated communications tunnel, wherein the second set of storage operations includes verifying and storing metadata hashes of the data blocks in a blockchain maintained by the computing node chain.

2. The method of claim 1, wherein the storage array is a centralized storage array and the at least one computing network is a private decentralized network of computing nodes.

3. The method of claim 1, further comprising qualifying the storage array as a full node of the computing network, wherein qualifying the storage array as the full node includes provisioning at least a first threshold amount of the storage array's resources for performing the first set of storage operations.

4. The method of claim 1, further comprising:
provisioning the computing network's nodes with light node resources to perform the second set of storage operations, wherein an amount of computing resources corresponding to the light node resources are less than an amount of computing resources required to perform the first set of storage operations.

5. The method of claim 1, wherein performing the first set of storage operations, includes pre-processing the data blocks.

6. The method of claim 5, wherein pre-processing the snapshot includes generating a first data block of the snapshot's data blocks having at least a header and a payload.

7. The method of claim 6, further comprising:
generating a first hash using the snapshot's corresponding metadata;
inserting the first hash in the first data block's header; and
filling the first data block's payload with the metadata.

8. The method of claim 7, further comprising:
generating a second data block of the snapshot's data blocks, wherein generating the second data block includes:
generating a second hash from the first hash,
inserting the second hash into the second data block's header, and
filling the second data block's payload with the first hash.

9. The method of claim 8, further comprising:
enabling each of the computing network's nodes to verify at least the first and second data blocks; and
authorizing each of the computing network's nodes to store at least the first and second data blocks in response to a positive verification.

10. The method of claim 1, further comprising:
monitoring one or more input/output (IO) workloads received by the storage array;
identifying one or more IO write patterns related to each IO workload;
generating at least one predictive array snapshot based on the identified IO write patterns; and
in response to a current IO workload including at least one IO write operation, generating the snapshot within a threshold response time.

11. An apparatus configured to a memory and processor configured to:
perform a first set of storage operations on a snapshot of a storage array;
form a dedicated communications tunnel between the storage array and a primary chain link node of at least one computing network, including a computing node chain, wherein the dedicated communications tunnel is formed by logically grouping a set of direct communications channels established between the storage array and the primary chain link node; and
broadcast data blocks generated from the snapshot to the primary chain link node for the computing chain node to perform a second set of storage operations via the dedicated communications tunnel, wherein the second set of storage operations includes verifying and storing metadata hashes of the data blocks in a blockchain maintained by the computing node chain.

12. The apparatus of claim 11, wherein the storage array is a centralized storage array and the at least one computing network is a private decentralized network of computing nodes.

13. The apparatus of claim 11, further configured to qualify the storage array as a full node of the computing network, wherein qualifying the storage array as the full node includes provisioning at least a first threshold amount of the storage array's resources for performing the first set of storage operations.

14. The apparatus of claim 11, further configured to:
provision the computing network's nodes with light node resources to perform the second set of storage operations, wherein an amount of computing resources corresponding to the light node resources are less than an amount of computing resources required to perform the first set of storage operations.

15. The apparatus of claim 11, wherein the first set of storage operations includes pre-processing the data blocks.

16. The apparatus of claim 15, wherein pre-processing the snapshot includes generating a first data block of the snapshot's data blocks having at least a header and a payload.

17. The apparatus of claim 16, further configured to:
generate a first hash using the snapshot's corresponding metadata;
insert the first hash in the first data block's header; and
fill the first data block's payload with the metadata.

18. The apparatus of claim 17, further configured to:
generate a second data block of the snapshot's data blocks, wherein to generate the second data block, processor and memory are further configured to:
generate a second hash from the first hash,
insert the second hash into the second data block's header, and
fill the second data block's payload with the first hash.

19. The apparatus of claim 18, further configured to:
enable each of the computing network's nodes to verify at least the first and second data blocks; and
authorize each of the computing network's nodes to store at least the first and second data blocks in response to a positive verification.

20. The apparatus of claim 11, further configured to:
monitor one or more input/output (IO) workloads received by the storage array;
identify one or more IO write patterns related to each IO workload;
generate at least one predictive array snapshot based on the identified IO write patterns; and
in response to a current IO workload including at least one IO write operation, generate the snapshot within a threshold response time.

* * * * *